US011149711B2

(12) United States Patent
Nielsen

(10) Patent No.: US 11,149,711 B2
(45) Date of Patent: Oct. 19, 2021

(54) CONTROL METHOD FOR A WIND TURBINE

(71) Applicant: VESTAS WIND SYSTEMS A/S, Aarhus N (DK)

(72) Inventor: Johnny Nielsen, Svenstrup J (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 168 days.

(21) Appl. No.: 16/060,120

(22) PCT Filed: Dec. 22, 2016

(86) PCT No.: PCT/DK2016/050461
§ 371 (c)(1),
(2) Date: Jun. 7, 2018

(87) PCT Pub. No.: WO2017/108062
PCT Pub. Date: Jun. 29, 2017

(65) Prior Publication Data
US 2018/0355846 A1 Dec. 13, 2018

(30) Foreign Application Priority Data

Dec. 22, 2016 (DK) .......................... PA 2015 70868

(51) Int. Cl.
F03D 17/00 (2016.01)
F03D 7/02 (2006.01)

(52) U.S. Cl.
CPC ......... F03D 7/0204 (2013.01); F03D 7/0224 (2013.01); F03D 17/00 (2016.05);
(Continued)

(58) Field of Classification Search
CPC ...... F03D 17/00; F03D 7/0204; F03D 7/0224; F03D 7/02; F05B 2200/30; F05B 2270/32;
(Continued)

(56) References Cited

U.S. PATENT DOCUMENTS 8,890,349 B1 * 11/2014 Lynch .................. F03D 7/0264
290/44
2007/0035135 A1 2/2007 Yoshida
(Continued)

FOREIGN PATENT DOCUMENTS

| CN | 102648345 A | 8/2012 |
| CN | 203515963 U | 4/2014 |
| WO | 2017108062 A1 | 6/2017 |

OTHER PUBLICATIONS

PCT International Search Report for Application No. PCT/DK2016/050461 dated Dec. 23, 2015.
(Continued)

Primary Examiner — Igor Kershteyn
Assistant Examiner — Joshua R Beebe
(74) Attorney, Agent, or Firm — Patterson + Sheridan, LLP

(57) ABSTRACT

Method of controlling a wind turbine. A data set is obtained that includes a direction of the wind relative to the wind turbine and a pitch angle parameter representing a pitch angle of at least one of the wind turbine blades. Based on the obtained data sets, a statistical representation of the pitch angle parameter as a function of the relative wind direction is determined, which is then used in estimating a wind direction offset corresponding to the relative wind direction where the pitch angle parameter attains a maximum. The relative wind direction of the wind turbine is then adjusted as a function of the wind direction offset.

19 Claims, 5 Drawing Sheets

(52) U.S. Cl.
CPC ....... *F05B 2200/30* (2013.01); *F05B 2270/32* (2013.01); *F05B 2270/321* (2013.01); *F05B 2270/802* (2013.01); *Y02E 10/72* (2013.01)

(58) Field of Classification Search
CPC ......... F05B 2270/321; F05B 2270/802; Y02E 10/723
See application file for complete search history.

(56) References Cited

U.S. PATENT DOCUMENTS

| | | | |
|---|---|---|---|
| 2007/0041837 A1 | 2/2007 | Ide et al. | |
| 2007/0212209 A1 | 9/2007 | Borgen | |
| 2009/0146424 A1* | 6/2009 | Kammer | F03D 7/0224 290/44 |
| 2011/0101691 A1 | 5/2011 | Hashimoto et al. | |
| 2012/0134807 A1* | 5/2012 | Axelsson | F03D 7/0204 416/1 |
| 2012/0139248 A1* | 6/2012 | Bertolotti | F03D 7/0204 290/44 |
| 2013/0099497 A1* | 4/2013 | Bowyer | F03D 7/042 290/44 |
| 2013/0149146 A1* | 6/2013 | Sasseen | F03D 7/0204 416/1 |
| 2014/0348650 A1 | 11/2014 | Hansen | |
| 2015/0086357 A1* | 3/2015 | Gregg | F03D 7/046 416/1 |
| 2016/0076517 A1* | 3/2016 | Butterworth | F03D 17/00 416/1 |
| 2017/0268484 A1* | 9/2017 | Li | F03D 7/0204 |

OTHER PUBLICATIONS

PCT Written Opinion of the International Searching Authority for Application No. PCT/DK2016/050461 dated Dec. 22, 2016.
First Technical Examination for Patent Application PA 2015 70868 dated Jul. 1, 2016.
Chinese Office Action for Application No. 201680079754.8 dated May 8, 2019.
India Intellectual Property First Examination Report for Application No. 201817022429 dated Dec. 16, 2020.

* cited by examiner

A

B

C

D

CONTROL METHOD FOR A WIND TURBINE

FIELD OF THE INVENTION

The present invention relates to a method of controlling a wind turbine, the wind turbine comprising a wind direction sensor, pitchable wind turbine blades attached to a rotor hub, a yawing system, and a control system for yawing the wind turbine rotor relative to the wind with the aim of controlling the wind turbine optimally under different and changing wind directions. The invention furthermore relates to control system for performing the control method and a wind turbine comprising such control system.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to optimize the power production and reduce the loads of the turbine it is important to know the right relative wind direction of the free flow wind. Most often the wind direction is measured by a wind direction sensor such as a wind vane placed on top of the nacelle and the wind turbine rotor is then continuously yawed to face the wind. If the wind direction measurements are off even by one or a few degrees, the resulting misalignment of the turbine rotor may cause increased and different loadings on the wind turbine blades than anticipated, and thereby increased wear and fatigue on the blades, blade root connections, bearings etc. Further, a misalignment of the turbine rotor causes a non-negligible reduction in the power production over time.

The measurements from a wind direction sensor may however far from always be accurate for one reason because the rotor disturbs the free flow wind before reaching the wind sensor.

One way to compensate for this problem is by calibrating the wind vane measurements by a basic set of Wind Correction Parameters (WCP). These parameters are typically found on a prototype turbine by comparing the measurements from the wind sensors on the turbine with measurements from a nearby Met Mast. Such measurement campaign however will take several weeks. Further, before the measurement campaign can be started, the wind sensor needs to be aligned with the main shaft of the turbine. This is done with as special alignment tool. The Wind Correction Parameters found on the prototype can then be used on all the wind turbines of the same type. So in order to comply with the found Wind Correction Parameters a wind sensor needs first to be aligned exactly in the same way as on the prototype turbine to get the right wind direction measurement. This alignment is both time consuming and not always accurate, when carried out in 100 m height. Furthermore, the wind sensors may sometimes need to be realigned after some time due to wear, bolts being worked loose over time etc.

It has also been found that these Wind Correction Parameters do not fit the individual turbines across the fleet very well. The actual airflow around a wind sensor will change from turbine to turbine, from site to site, and also change on the same turbine during a year. Furthermore, making changes or modifications to the for example wind turbine blades, the nacelle roof, or a cooler top on the nacelle have been seen to cause changes to the airflow around the wind sensors thereby making the Wind Correction Parameters less accurate. Further, it has been found that the wind direction sensors are affected by the flow across the rotor, so that the measurements are also dependent on the rotor speed and on the wind speeds.

In some methods, like disclosed in US2010/0066087, the wind direction sensors are calibrated by a parameter corresponding to the yaw angle where the power of the wind turbine is the maximum. However, such methods are only applicable in the limited area of partial load production at wind speeds below nominal wind speed. At these wind speeds, the turbine is generally operated to yield as high a power as possible, whereas at higher wind speeds, the turbine is generally operated to minimize the loads yielding a nominal power. Therefore, the wind correction parameters determined during partial power production are not necessarily very precise for the full production regime and the higher wind speeds.

Object of the Invention

It is an object of embodiments of the present invention to provide a control method for a wind turbine which obviate or reduce some of the above mentioned problems in known controlling methods.

It is therefore an object of embodiments of the present invention to overcome or at least reduce some or all of the above described disadvantages of the known wind direction measurements by providing a wind turbine controlling method of improved yawing and reduced risk of misalignment of the wind turbine rotor.

It is a further object of embodiments of the invention to provide a method of improving the wind direction measurements obtained by a wind direction sensor also for wind direction measurements performed during full power production of the wind turbine. It is a further object of the invention to provide a control method for a wind turbine increasing the annual energy production (AEP) of the wind turbine while preferably reducing the fatigue loading or wear on the turbine due to misalignment of the rotor in the wind.

It is a further object of embodiments of the invention to provide a method of improving the wind direction measurements obtained by conventional wind direction sensors and to provide a method of calibrating measurements from a wind direction sensor which may be implemented on existing equipment.

A further object of embodiments of the invention is to provide a method to calibrate measurements from an existing wind direction sensor without the need of physically adjusting the sensor and without the need of comparative measurements from a nearby Met Mast.

So, in a first aspect the present invention relates to a method of controlling a wind turbine, the wind turbine comprising a wind direction sensor, a yawing system, wind turbine blades attached to a rotor hub, and a control system for pitching the blades relative to the rotor hub and for turning the wind turbine rotor relative to the wind, and where the method comprises:

obtaining at time intervals a data set comprising a direction of the wind relative to the wind turbine as measured by the wind direction sensor and a pitch angle parameter representing a pitch angle of at least one of the wind turbine blades;

determining over time a statistical representation of the pitch angle parameter as a function of the relative wind direction based on the obtained data sets;

estimating from the statistical representation a wind direction offset corresponding to the relative wind direction where the pitch angle parameter is a maximum;

adjusting the relative wind direction as a function of the wind direction offset;

determining a control parameter of the wind turbine as a function of the adjusted relative wind direction; and;

controlling the wind turbine according to the control parameter.

Hereby is obtained a simple yet effective control method improving the determination of the wind direction relative to the wind turbine and reducing the risk of misaligning the rotor relative to the wind, as the control parameters are based on adjusted or calibrated wind direction measurements.

Furthermore is obtained a simple and effective control method for increasing the performance such as the annual energy production (AEP), as the control parameter is determined based on the adjusted wind direction measurements whereby is obtained a better alignment of the rotor to the wind as actually experienced by the rotor. Also, the wind turbine is better protected as a more precise alignment of the rotor to the free wind generally results in better control of the loads on the wind turbine blades and reduced wear on components.

It has been found that the wind direction measurements used to determine the optimal orientation of the wind turbine can advantageously be adjusted based on a wind direction offset parameter determined by the proposed method. The wind direction offset parameter is established by observing over time the pitching of the blades at different relative wind directions as measured by the wind direction sensor. The algorithm will find the relative wind direction corresponding to a peaking pitch and use this relative wind direction as a wind direction offset. The wind direction offset parameter determined according to this method has proven to be a good and effective measure for the misalignment of the wind direction sensor.

Hereby the relative wind direction can advantageously be adapted by the determined wind direction offset parameter.

The control parameter may preferably by a yawing parameter for the wind turbine and the controlling of the wind turbine then comprises yawing the wind turbine according to the yawing parameter. Hereby the yawing parameter of the turbine is based on more accurate wind direction data improving the control of the wind turbine. The control parameter may alternatively or additionally comprise other control parameters which to some extend depends on the wind direction relative to the wind turbine, such as power control, or up- and/or down-rating of the nominal power.

The pitch angle parameter may be determined as the pitch angle of one of the turbine blades or as an average of the pitch angles.

The method according to the invention advantageously determines the wind direction offset as a function of the pitch of the blades which are especially changed in the full power production regime and at higher wind speeds. Hereby the determined wind direction offset parameters captures the inaccuracies of the wind direction measurements in particular in higher and full power production far better. As the wear and the loads in general are much higher and potentially critical on a wind turbine operated at full power production, it is correspondingly important to be able to determine the wind direction accurately so as to preferably avoid misaligning the turbine, and at least so as to be able to determine the loads acting on the turbine more precisely. This is obtained with the proposed method where the wind direction is adjusted based on the blade pitch angles, the adjustments of which reflect especially the operating conditions of the wind turbine at the higher wind speeds.

The statistical representation may be established as a histogram reflecting for each relative wind direction the pitch angle parameter detected at that relative wind direction. The statistical representation thereby over time yields a probability distribution of the pitch angle parameter as a function of the relative wind directions.

The obtained data sets may be stored or may be used in each time step just to update the statistical representation.

A data set of a determined pitch angle parameter and a measured relative wind direction may be averaged over a relatively short period of time such as e.g. 30 seconds to hereby reduce influence by turbulence etc.

Then the wind direction offset is extracted from the data sets and from the statistical representation as the wind direction yielding a maximum value of the pitch angle parameter.

The wind direction offset may then advantageously be used to adjust the relative wind direction both in partial and in full load operation of the turbine corresponding to having calibrated the wind direction sensor. The relative wind direction is adjusted as a function of the wind direction offset, such as by a simple subtraction, by a linear function or some other function. Likewise the adjustment may be performed by a PI or PID control.

The method may be performed by adjusting the relative wind direction by an adaptive wind direction parameter prior to estimating the statistical representation. The adaptive wind direction parameter is thereafter updated as a function of the wind direction offset and potentially as a function of earlier adaptive wind direction parameters. The relative wind direction is then adjusted by the updated adaptive wind direction parameters. The method according to this is essentially the same, only the data handling and the parameters to be stored may be different.

The proposed method may advantageously be used to adaptively find the misalignment of a wind direction sensor on any individual wind turbine and without use of or the need for any special tools or man power for performing a physical calibration.

Also, the method according to the invention will advantageously calibrate the measurements from the wind direction sensor automatically compensating for any changes made on the turbine affecting the airflow around the sensors, like for instance if other sensors or aviation lights are placed close to the wind sensors, without the need for any information on the cause of the changes.

The wind direction offset parameter for the wind direction measurements may be determined initially a first time on any new wind turbine after having been erected, but may likewise be re-estimated later at other times during the lifetime of the wind turbine for example at fixed time intervals such as a number of times every year, or at special times when requested, or may be re-iterated on and re-estimated at regular intervals or continuously.

For example, the method according to the invention can be performed and an updated wind direction offset parameter estimated whenever work or maintenance has been performed on the nacelle thereby ensuring that any changes potentially affecting the measurements from the wind direction sensors would be taken into account.

Also, the wind direction offset parameter can be re-established a number of times each year thereby catching and taking into account the seasonal variation in the airflow around the wind sensors which also affects the wind direction measurements. Such seasonal variations may for example be caused by temperature and/or density changes, and changes to the vegetation around the wind turbine such as leaves on the trees.

Depending on the amount of data and the number of data sets used in the statistical representation, the wind direction offset parameter can be obtained as a rough estimate relatively quickly or can be determined based on more extensive data material. Hereby, the wind direction offset parameter can be obtained relatively quickly if desired (for example as a first calibration parameter on a new turbine or after maintenance work on the nacelle) or can be determined more slowly and more accurately for finer adjustments.

Further, the adjustments are in an embodiment implemented in a slow control loop whereby the wind turbine continuously optimizes the alignment to compensate for the small changes that can occur over time.

The control method may be implemented on new or existing wind turbines as pure software implementation with no need for any additional hardware on the turbine or may be implemented as a combination of software and hardware.

The data sets may be obtained at time intervals of fixed length such as every minute, a number of times every second or every minute, every hour or every day. Preferably a data set is obtained at each sample such as several times per second. Short intervals are advantageous in reducing the risk of obtaining the data during a yaw operation where the data may in some cases potentially be cluttered.

The wind direction offset may advantageously be estimated without or independent of the wind speed. Hereby the control method becomes insensitive to fluctuating or fast changing wind speeds or to inaccurate wind speed measurements or estimations, which may otherwise be a problem in some control methods. Often, the wind speed measurements in themselves are inaccurate due to for example a misalignment or rotor effects. Therefore, being able to correct the wind direction measurements independently of the wind speed improves the accuracy of the wind direction determination.

In an embodiment of the invention, the method further comprises pre-setting a number of intervals of pitch angle parameter, and determining a statistical representation for each interval based on the obtained data sets for that interval. Hereby, a number of wind direction offsets are determined thereby more accurately capturing how the wind direction sensor measurements are often seen to vary at different rotor speeds or rotor configuration (for example pitch angles). By determining and applying a number of wind direction offsets the wind direction can be determined more accurately.

The pitch intervals may for example be intervals of 0-5 degrees, 5-10 degrees, 10-15 degrees, and/or 15-20 degrees.

The number of statistical representations for different pitch angle intervals or pitch angle bins may be determined individually for example over different time periods or in parallel. One statistical representation for one pitch angle interval may be ready and applicable earlier than the others depending on the wind conditions.

In an embodiment, 2, 3, 4, 5, 6, 7, or 8 different statistical representations are made based on pitch angle within 2, 3, 4, 5, 6, 7, or 8 pitch angle intervals, respectively.

In an embodiment of the invention, the relative wind direction is adjusted as a function of the wind direction offset estimated from the statistical representation of the interval comprising the pitch angle parameter at the time of adjusting. In this way the wind direction offset of one statistical representation then is simply applied to adjust all relative wind directions when the actual pitch angle lies within the pitch angle interval of that statistical representation.

In an embodiment of the invention, the method according to the above further comprises estimating a wind direction offset for each interval of pitch angle parameter, and wherein the relative wind direction is adjusted by using an interpolation between the wind direction offsets of the different intervals. In this way the accuracy of the applied wind direction offset parameter to adjust the relative wind direction is further improved.

In an embodiment of the invention, a data set is disregarded when determining the statistical representation, if the detected wind speed is below a first wind speed threshold, if the power of the turbine is below a first power threshold, or the pitch angle is below a first pitch threshold, or combinations hereof. This first wind power threshold and wind speed threshold may be equal to the nominal power or the nominal speed for the wind turbine, respectively, or to some power reference related to the nominal power. Hereby only data sets of a pitch angle parameter and a corresponding measured relative wind direction are considered when occurring in the full load regime. Hereby the data observations from partial load operation where the blades are generally pitched to obtain as high output power as possible are not taken into account in the statistical representation whereby the estimation of the wind direction offset becomes more accurate and closer to the actual misalignment of the wind direction sensor. Alternatively or additionally information on the activity of the full load controller can be used. Then, a data set is disregarded when determining the statistical representation if the full load controller is not active.

In an embodiment of the invention and as mentioned in the above, the first wind speed threshold corresponds to a full load operation of the wind turbine, i.e. the wind speed corresponds to a nominal wind speed of the turbine.

In an embodiment of the invention and as mentioned in the above, the first power threshold corresponds to a factor times a nominal power of the wind turbine, the factor being in the interval of 0.8-1.2, such as in the range of 0.9-1.0. Hereby the control method takes into account if the wind turbine is operated at partial or at full load. Furthermore the control method advantageously takes into account any present derate or uprate of the wind turbine where the nominal power is modified either down or up for example during unstable or particularly favourable wind conditions, respectively. In an embodiment the first wind power threshold corresponds to a factor times a power reference of the wind turbine. Normally the power reference is the same as the nominal power, but in some situations the power reference is lower or higher than the nominal power. For example if a defect on a blade load sensor has been registered, the power reference may be reduced to 0.8 times the nominal power regardless of the current power production.

Likewise data sets may be disregarded if obtained at a wind speed above some relatively high wind speed threshold. By not using data sets obtained at very high wind speeds is obtained a more accurate wind direction offset.

The statistical representation is in an embodiment determined over a predetermined time period such as over one week or a pre-set number of days. The length of the time period may alternatively or additionally be set in dependence of other parameters such as for example the time of year, the general weather conditions, the desired accuracy of the wind direction offset or the time since the last estimation of a wind direction offset.

In an embodiment of the invention, the statistical representation is determined based on a predetermined number of data sets. Hereby is ensured that the wind direction offset is obtained based on a sufficiently large number of data in order to ensure a sufficient or a certain desired quality of the estimation of the wind direction offset. Further is ensured that the statistical representation is based on a sufficient amount of data which under some weather conditions may take longer time to obtain or may under some weather conditions be obtained faster than expected.

In a further embodiment, the statistical representation is determined based on at least a predetermined number of data sets within at least one predetermined interval of relative wind direction, such as in an interval of [(−6°)–(−4°)], [(−1°)–1°] and/or [4°–6° ]. Hereby is ensured that the wind direction offset is obtained based on a certain amount of relevant data thereby increasing the quality of the method. The wind direction offset may typically be around +/−10 degrees and therefore the statistical representation may advantageously be based at least on a certain number of data of relative wind directions within one or more of intervals also within +/−10 degrees such as within one or more of the above mentioned intervals.

According to a further embodiment of the invention, the steps of obtaining a data set and determining a statistical representation are repeated at time intervals. I.e. a new updated wind direction offset may be determined at time intervals, such as more or less continuously, after a week or a month from the last determination, or upon request, or after every shut down of the wind turbine, or combinations hereof.

In an embodiment of the invention, each data set further includes an estimated wind speed. This may be used in the step of determining a statistical representation such that a statistical representation is determined for a number of wind speed intervals, such as for wind speed intervals of 14-15 m/s 15-16 m/s, 16-17 m/s, and/or 17-18 m/s. One wind direction offset is then estimated from each statistical representation and the control parameter is then adjusted based as a function of the wind direction offset corresponding to the wind speed at the time of adjusting. Hereby may be obtained a set of wind direction offsets corresponding to different wind speeds.

The wind direction offset parameters have been found to be determined more precisely and be more accurate when an estimated wind speed is used compared to measured wind speeds. The estimated wind speeds have proven to yield more accurate results because the measured wind speed is relatively more inaccurate and varying relatively much with the yaw error.

The number of statistical representations for different wind speed intervals or wind speed bins may be determined individually for example over different time periods or in parallel. One statistical representation for one wind speed interval may be ready and applicable earlier than the others depending on the wind conditions.

In an embodiment, 2, 3, 4, 5, 6, 7, or 8 different statistical representations are made based on estimated wind speeds within 2, 3, 4, 5, 6, 7, or 8 wind speed intervals, respectively.

According to embodiment of the invention, the adjusting of the relative wind direction comprises subtracting the wind direction offset times a gain factor smaller than one, wherein the gain factor is the interval of 0.1-0.95, such as in the interval of 0.4-0.6, such as equal 0.5. Hereby too abrupt changes to the yawing are avoided and an improved convergence may be obtained.

In yet a further embodiment of the invention, the relative wind direction is further adjusted as a function of earlier wind direction offset parameters, whereby abrupt changes to the relative wind direction may be avoided and whereby switching back and forth between values may likewise be avoided. For example, the relative wind direction may be adjusted by a subtraction of the wind direction offset, and further a subtraction of the change in wind direction offset from the last to the present adjustment and times a gain factor.

In an embodiment of the invention, the method further comprises correcting the relative wind direction as measured by the wind direction sensor according to a predefined set of wind correction parameters. Hereby the relative wind direction measurement may initially be corrected based on a fixed pre-defined set of correction parameters for example taking into account any general physical misalignment of the wind direction sensor, any calibration parameters as for example provided by the sensor manufacturer etc. This additional step simply means that the relative wind direction is most likely at least a little more correct before estimating the statistical representation and that the wind direction offset is most likely correspondingly smaller.

The control method according to any of the preceding for establishing a wind direction offset preferably during full load operation may on some times or always be combined with other methods of adjusting the wind direction measurements. For example with a method for determining the wind direction offset based on parameters preferably detected and gathered during partial load operation of the wind turbine, i.e. at lower wind speeds below a nominal wind speed where the wind turbine is generally operated with a view to maximize the power output. In one embodiment, the relative wind direction may then be adjusted based on one (or more) wind direction offset(s) during partial load operation and based on another (or more) wind direction offset(s) determined differently during full load operation.

In a further aspect the present invention relates to a control system for a wind turbine configured to perform the steps of:
- obtaining at time intervals a data set comprising a direction of the wind relative to the wind turbine as measured by the wind direction sensor and a pitch angle parameter representing a pitch angle of at least one of the wind turbine blades;
- determining over time a statistical representation of the pitch angle parameter as a function of the relative wind direction based on the obtained data sets;
- estimating from the statistical representation a wind direction offset corresponding to the relative wind direction where the pitch angle parameter is a maximum;
- adjusting the relative wind direction as a function of the wind direction offset;
- determining a control parameter of the wind turbine as a function of the adjusted relative wind direction; and
- controlling the wind turbine according to the control parameter.

In a further aspect the present invention relates to a control system for a wind turbine configured to perform the steps of:
- obtaining at time intervals a data set comprising a direction of the wind relative to the wind turbine as measured by the wind direction sensor and a pitch angle parameter representing a pitch angle of at least one of the wind turbine blades;
- determining over time a statistical representation of the pitch angle parameter as a function of the relative wind direction based on the obtained data sets;

estimating from the statistical representation a wind direction offset corresponding to the relative wind direction where the pitch angle parameter is a maximum;

detecting at least one of a wind speed or a power of the wind turbine;

adjusting the relative wind direction as a function of the wind direction offset if the wind speed is above a first wind speed threshold and/or the power is above a first power threshold;

determining a control parameter of the wind turbine as a function of the adjusted relative wind direction; and controlling the wind turbine according to the control parameter.

In a further aspect the present invention relates to a wind turbine comprising a control system according to the above.

The advantages of the control system and the wind turbine comprising such control system are as described in relation to the control method in the previous.

BRIEF DESCRIPTION OF THE DRAWINGS

In the following different embodiments of the invention will be described with reference to the drawings, wherein.

DETAILED DESCRIPTION OF THE DRAWINGS

Figure 1:
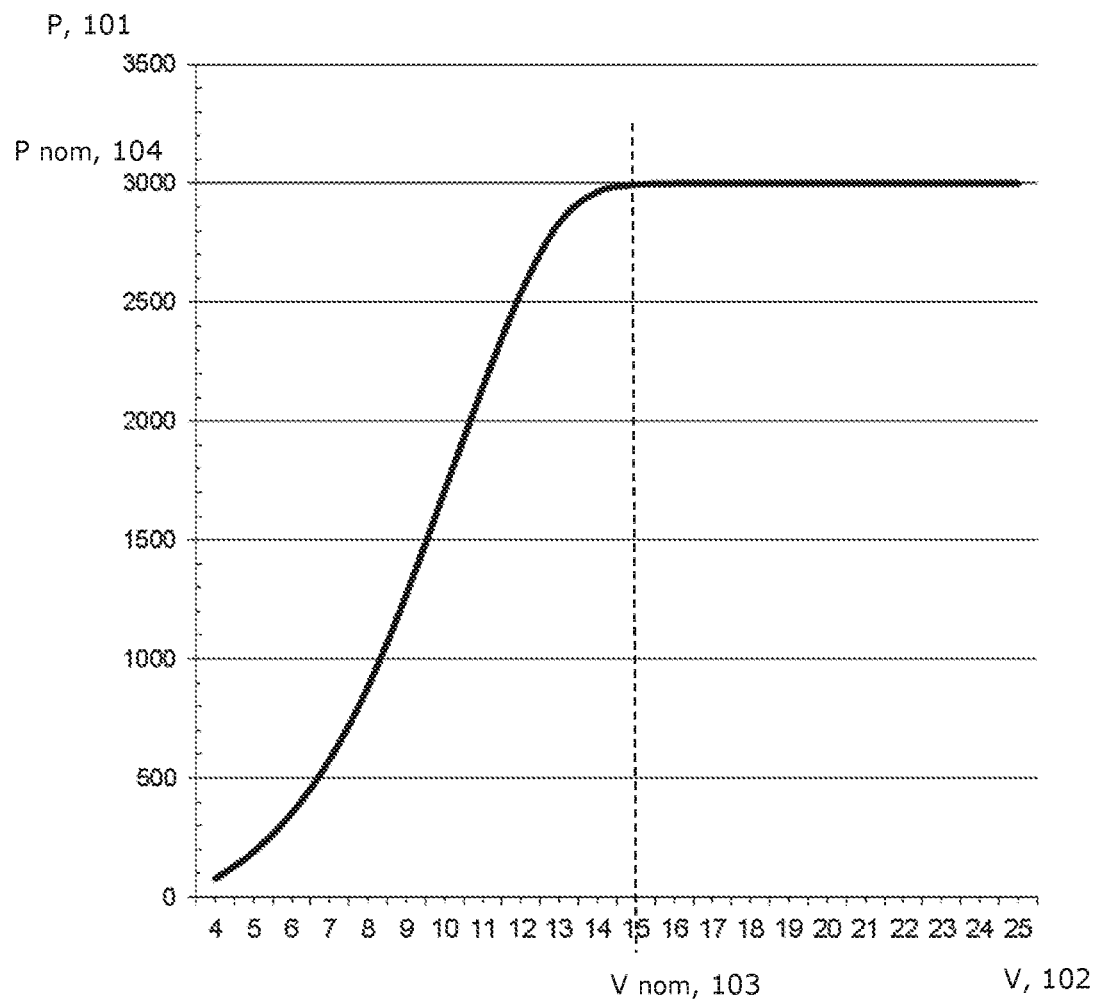
FIG. 1 shows an example of a conventional power curve during partial and full load operation.

FIG. 1 shows an example of a conventional or normal power curve with the power P, 101 shown as a function of the wind speed V, 102. At the lower wind speeds below the nominal wind speed $V_{nom}$, 103 and the nominal power $P_{nom}$, 104 (in this example a nominal wind speed of 15 m/s and a nominal power of 3000 kW) the wind turbine is under partial load operation where the wind turbine is controlled with a view to increase the power production. As can be seen from the FIG. 1, during partial load operation the power increases with increasing wind speeds until the nominal power of the wind turbine is reached. During full load operation at wind speeds above the nominal wind speed and/or when the power has reached the nominal power, the turbine is controlled by adjusting the pitch angles of the blades with a view to maintain the nominal power while reducing or controlling the loads on the turbine.

Generally, the wind turbine is therefore controlled according to partial load operation until a certain reference power is reached and the controlling is switched to full load operation. Often the reference power is the same as the nominal power for the wind turbine but may under some conditions and in some situations like for example during unstable weather conditions, be reduced by a factor to increase the safety of the wind turbine. Likewise, the reference power may under some conditions be uprated by a factor for example during favourable weather conditions.

Figure 2:
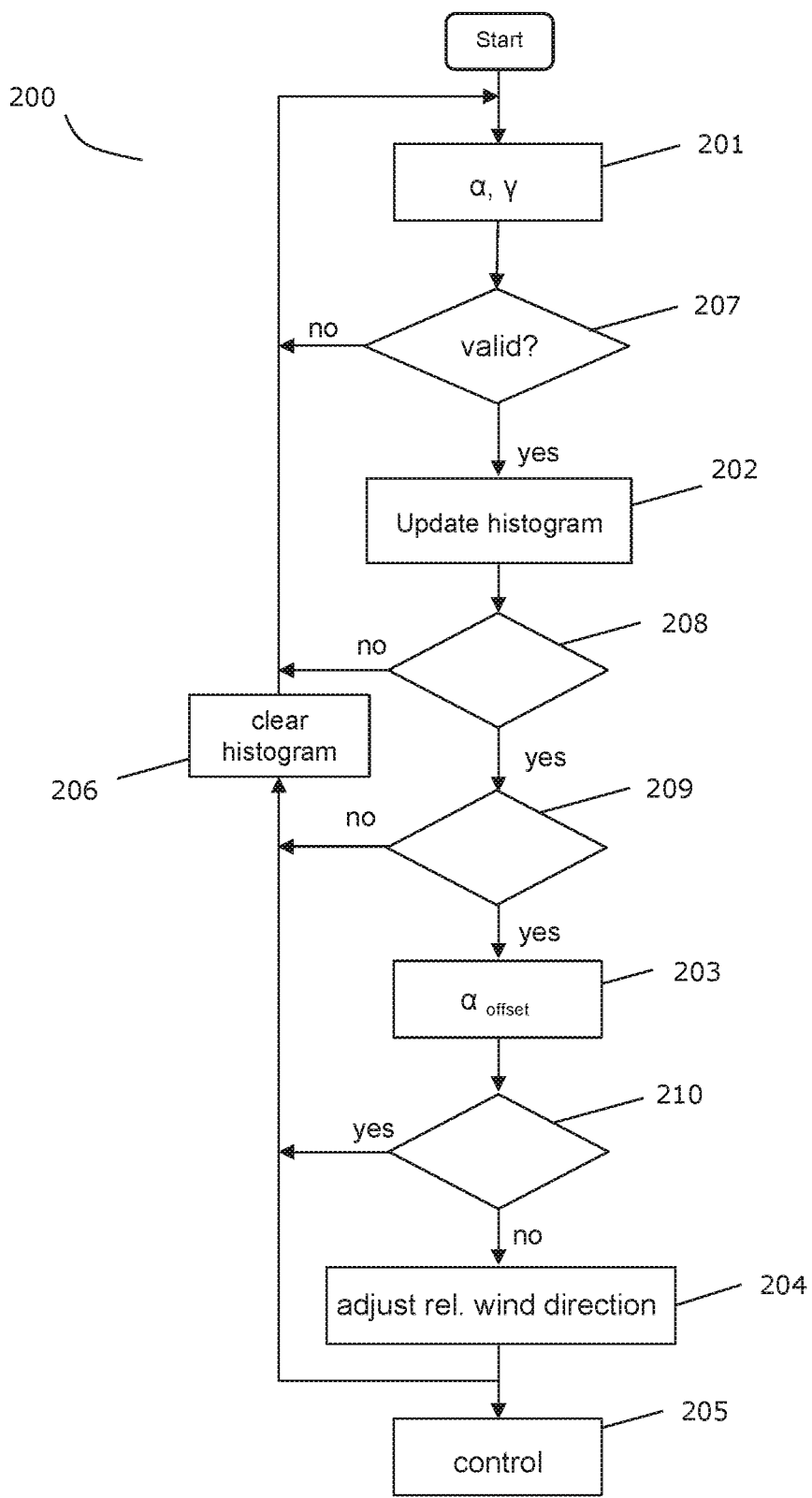
FIG. 2 is a flow chart illustrating embodiments of the invention.

FIG. 2 shows a flow chart illustrating the method steps performed in a control system, 200, of a wind turbine according to the invention. The control method comprises measuring a direction of the wind relative to the wind turbine by means of a wind direction sensor and a blade pitch angle parameter, 201. The blade pitch angle parameter may be for example determined as the average of the pitch angles of all the wind turbine blades. Preferably, the relative wind direction is initially adjusted according to a predefined set of wind direction correction parameters. This data forming a set is used in determining over time a statistical representation of the blade pitch angle parameter as a function of the relative wind direction, 202. The statistical representation may comprise a histogram over the average pitch angle versus the relative wind direction updated as more data are obtained. From this statistical representation is then estimated a wind direction offset $\alpha_{offset}$ corresponding to the relative wind direction yielding a peak pitch angle parameter, 203. Examples of such determination are given in FIGS. 3-6. Then the relative wind direction as measured by the wind direction sensor is adjusted so that the peak of the pitch angle parameter is moved closer to a relative wind direction of 0 degrees, 204. The adjusted wind direction can then be used in determining control parameters and in controlling the wind turbine, for example in determining the desired yawing parameter for the wind turbine, 205. This method based on detecting the pitch angle parameter over time as a function of the measured relative wind direction yields an effective adjustment of the wind direction measurements preferably based on parameters detected during full load operation of the wind turbine at higher wind speeds and power at or above nominal power.

The determination of the wind direction offset parameter may be repeated at time intervals based on new and recollected sets of data, 206.

The determination of the wind direction offset parameter and thereby the adjustment of the wind direction may be improved by sorting the data sets used in the statistical representation and disregard invalid data or data of lower quality, 207. For example a data set may be disregarded if the wind speed and/or the power is outside a certain range. The control system may further include counting the number of samples or data sets at each relative wind direction, 208, thereby ensuring that the statistical representation is based on a certain minimum amount of data in different wind direction intervals. Also, the quality of the statistical representation may be further improved by checking before estimating the wind direction offset parameter that the overall shape of the histogram of the average pitch angle parameter as a function of the measured wind direction is as expected, 209.

Figure 3:
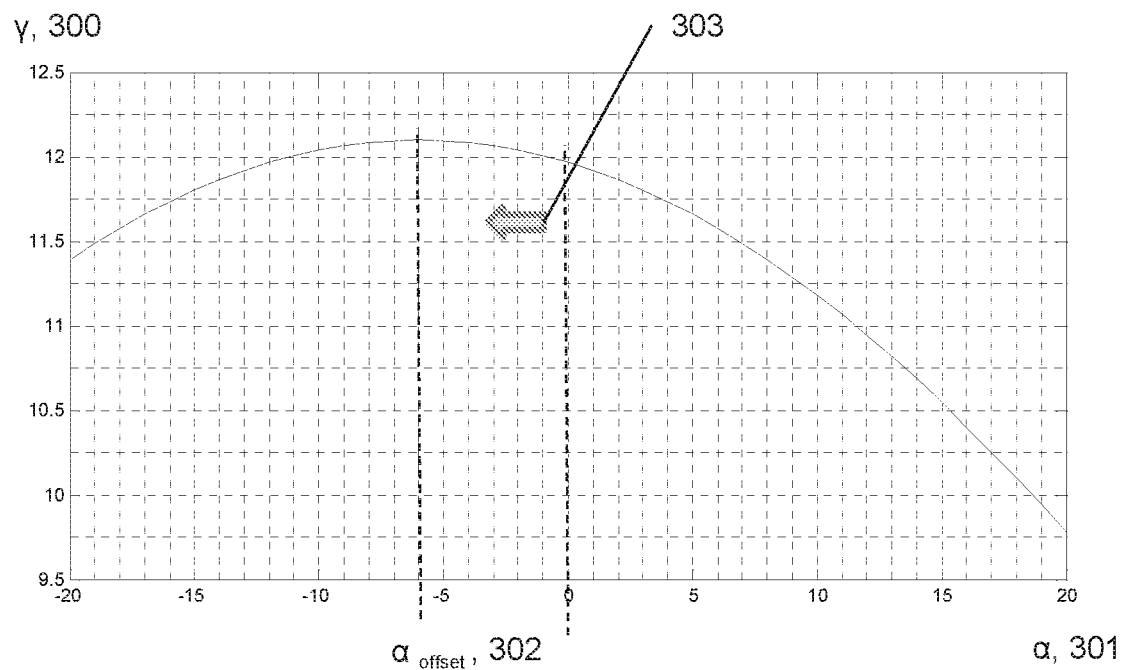
FIG. 3 shows a statistical representation of the average pitch angle as a function of the relative wind direction from which a wind direction offset can be determined according to an embodiment of the invention, FIGS. 4 A-D show four statistical representations of the average pitch angle vs measured relative wind direction at four different wind speeds, FIGS. 5 and 6 A-D show four histograms and statistical representations of the average pitch angle vs measured relative wind direction at four different pitch angle intervals.

FIG. 3 shows an example of a statistical representation of the average blade pitch angle γ, 300, at different measured relative wind directions, a, 301. From this is extracted that the average pitch angle attains a maximum at a relative wind direction of −6 degrees as indicated by the arrow, 303. This is then estimated as the wind direction offset, 302. In a situation like this, the measured relative wind direction will be adjusted correspondingly 6 degrees, or at least an amount towards the 6 degrees.

Figure 4:
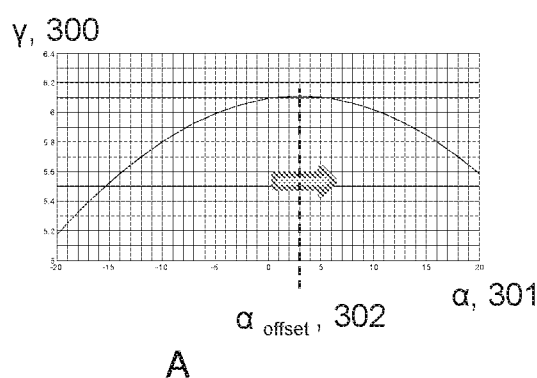
Figure 4:
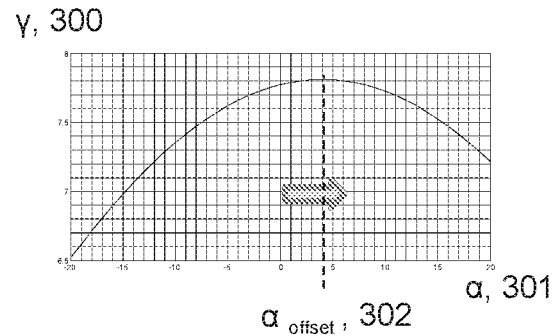
Figure 4:
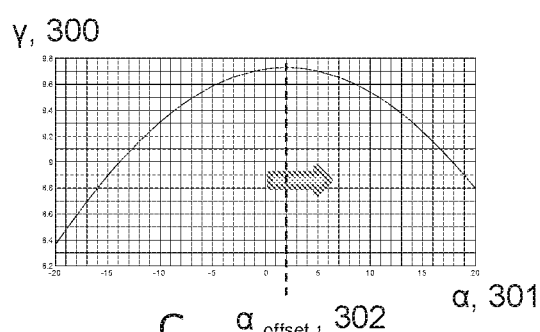
Figure 4:
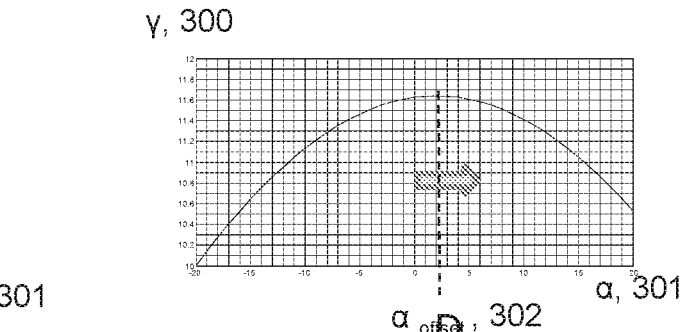

FIG. 4 shows an example where 4 different statistical representations have been determined at 4 different wind speed bins as shown in A, B, C, and D. Based on these measurements, the wind direction offset is determined as +3 degrees for wind speeds between 14-15 m/s (FIG. 4A), as +4 degrees for wind speeds in the interval of 15-16 m/s (FIG. 4B), +2 degrees for wind speeds in the interval of 16-17 m/s (FIG. 4C), and +2 degrees in the last wind speed interval of 17-18 m/s in FIG. 4D. These wind direction offsets are then used to adjust the relative wind direction depending on the wind speed.

Preferably and yielding a more accurate wind direction correction, the wind direction offset parameters may be determined independently of the wind speed. This is illustrated in FIGS. 5 and 6 A-D.

Figure 5:
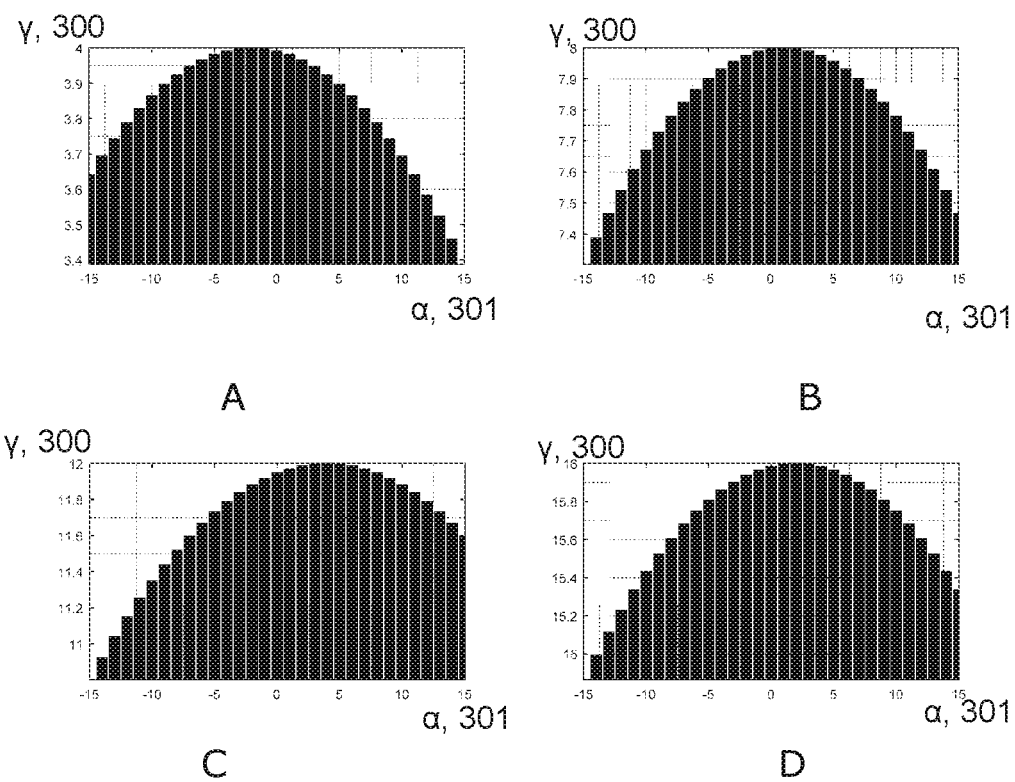
Figure 6:
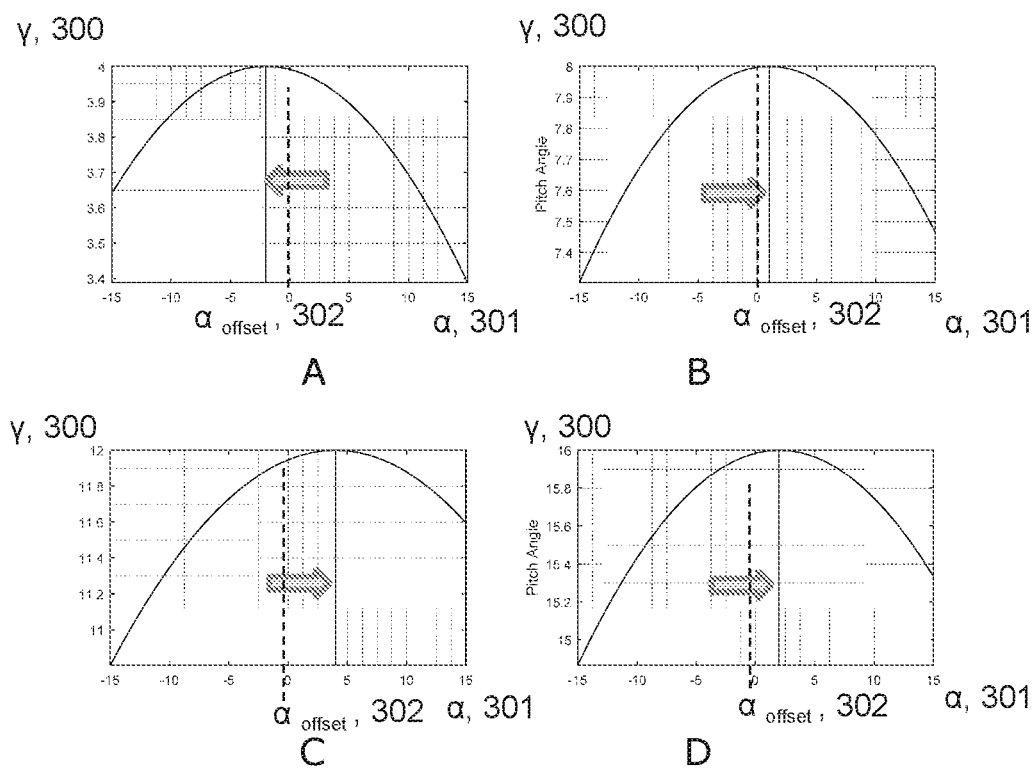

FIGS. 5 and 6 show an example where 4 different statistical representations have been determined not at different wind speed bins as was the case in FIG. 4, but rather at 4 different pitch angle intervals. In FIG. 5 A-D is shown the histograms built up as the data sets are collected, and FIG. 6 A-D then show the resulting statistical representation from the histograms of FIG. 5. Here, the data sets are sorted into 4 different pitch angle bins or intervals. From each pitch angle bin is determined a wind direction offset parameter in the same way as previously described and as indicated in FIG. 6. The wind direction offset parameters are determined as approximately −2 degrees for pitch angles between 0-5 degrees (FIG. 6A), as +1 degree for pitch angles in the interval of 5-10 degrees (FIG. 6B), +4 degrees for pitch angles in the interval of 10-15 degrees (FIG. 6C), and +2 degrees in the last pitch angle interval of 15-20 degrees in FIG. 6D. These wind direction offsets are then used to adjust the relative wind direction depending on the pitch angle.

Figure 7:
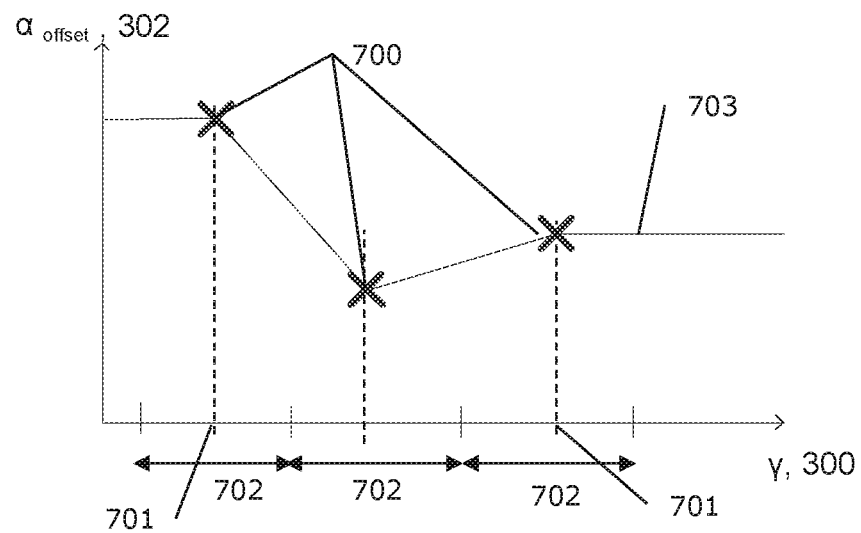
FIG. 7 illustrates the interpolation of different wind direction offset parameters.

This approach may be improved even further by interpolating between the wind direction offsets determined from the different pitch intervals to thereby obtain interpolated values for the wind direction offset parameters. This is illustrated in FIG. 7. Here, the crosses 700 mark the determined wind direction offset parameters 302 as assigned to the average pitch value 701 in each pitch interval 702. The pitch intervals 702 are indicated along the x-axis of the figure. The interpolation 703 between the points 700 yields the wind direction offset to be used as a function of the actual pitch angle 300.

Figure 8:
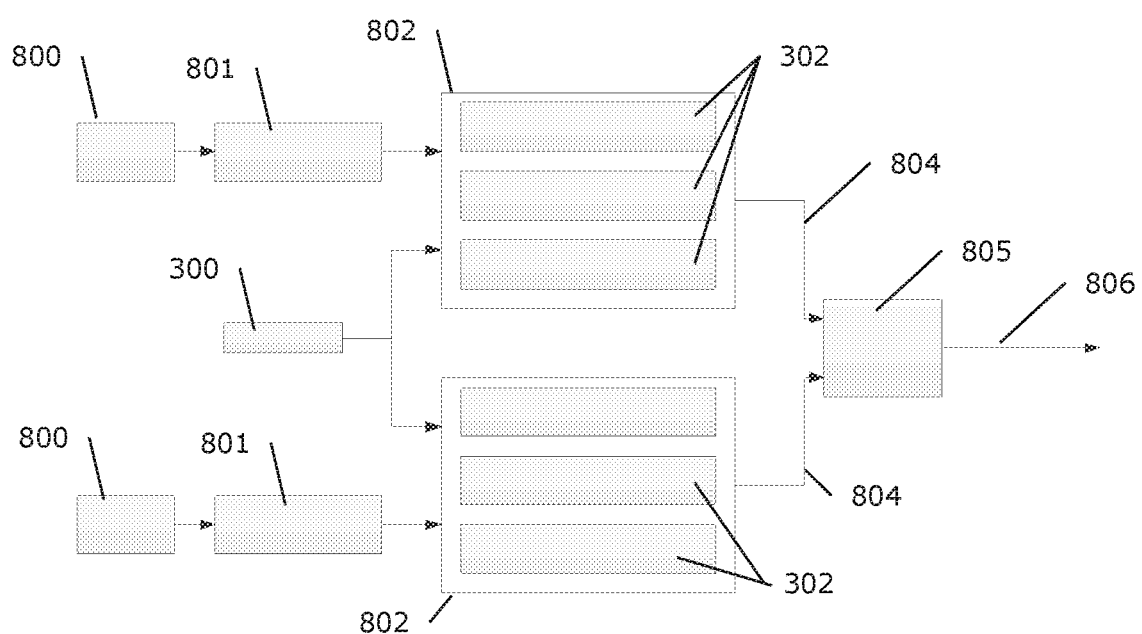
FIG. 8 illustrates the method according to embodiments of the invention applied on more wind direction sensor measurements.

Often, several wind direction sensors 800 are used on a wind turbine. In that case the wind direction measurements from each sensor 800 may be corrected individually by different sets of wind direction offset parameters, and the adjusted relative wind direction from each sensor then fused to yield a common final corrected relative wind direction to be applied in the control system of the wind turbine. This is illustrated in FIG. 8. Here, the wind direction measurements from two different sensors 800 are first each corrected or calibrated 801 based on pre-defined wind correction parameters. Then, the relative wind direction for each sensor is adjusted 802 based on the wind direction offset parameters 302 for the relevant wind speed bin and/or pitch angle interval and as determined by the actual pitch angle 300 and wind speed. The hereby adjusted relative wind directions 804 are then fused 805 to yield the final corrected relative wind direction 806. The sensor fusion 805 may simply be the average of the two input values. This may especially be the case as long as both sensors I and II (800) show no indications of failures or abnormal behaviour.

Fault detection and fault diagnosis may be performed of each of the sensors, and the more failures or abnormal behaviour a sensor shows, the lower it will be weighted in the sensor fusion 805. In the event that both sensors show abnormal behaviour, the fusion may start to take into account previous sensor results as well.

The examples and embodiments described above are for example purposes only, and it will be appreciated that features of different embodiments may be combined with one another in any combination.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine, the wind turbine comprising a wind direction sensor, a yawing system, wind turbine blades attached to a rotor hub, and a control system for pitching the blades relative to the rotor hub and for turning the wind turbine rotor relative to the wind, the method comprising:
   obtaining, at time intervals during operation of the wind turbine, data sets comprising a wind direction relative to the wind turbine as measured by the wind direction sensor, and a pitch angle of at least one of the wind turbine blades;
   disregarding a first data set of the data sets upon determining that the first data set indicates that a speed of the wind is below a first wind speed threshold that corresponds to a full load operation of the wind turbine;
   determining, as the pitch angle varies over time, a statistical representation of the pitch angle as a function of the relative wind direction based on remaining data sets, wherein the remaining data sets do not include the first data set;
   estimating, from the statistical representation, a wind direction offset of the relative wind direction where the pitch angle is a maximum;
   adjusting the relative wind direction as a function of the wind direction offset;
   determining a control parameter of the wind turbine as a function of the adjusted relative wind direction; and
   controlling the wind turbine according to the control parameter.

2. The method of claim 1, further comprising pre-setting a number of intervals of the pitch angle, and determining a statistical representation for each interval based on the obtained data sets for that interval.

3. The method of claim 2, wherein the relative wind direction is adjusted as a function of the wind direction offset estimated from the statistical representation of the interval comprising the pitch angle at the time of adjusting.

4. The method of claim 2, further comprising estimating a wind direction offset for each interval of pitch angle, and wherein the relative wind direction is adjusted by using an interpolation between the wind direction offsets of the different intervals.

5. The method of claim 1, further comprising:
   disregarding a second data set of the data sets upon determining that the second data set indicates that a power output of the wind turbine is below a first power threshold that corresponds to a full load operation of the wind turbine; and
   updating the remaining data sets, wherein the remaining data sets do not include the second data set.

6. The method of claim 1, further comprising:
   disregarding a third data set of the data sets upon determining that the third data set indicates that a pitch angle is below a first pitch angle threshold that corresponds to a full load operation of the wind turbine; and updating the remaining data sets, wherein the remaining data sets do not include the third data set.

7. The method of claim 5, wherein the first power threshold comprises a factor times a nominal power of the wind turbine, wherein the factor is between the range of 0.8-1.2.

8. The method of claim 6, wherein the first pitch angle threshold comprises a factor times a nominal pitch angle of the wind turbine, wherein the factor is between the range of 0.8-1.5.

9. The method of claim 1, wherein the statistical representation is determined over a predetermined time period.

10. The method of claim 1, wherein the statistical representation is determined based on a predetermined number of data sets.

11. The method of claim 1, wherein the statistical representation is determined based on at least a predetermined number of data sets within at least one predetermined interval of relative wind direction.

12. The method of claim 1, wherein obtaining the data set and determining the statistical representation are repeated at a fixed time interval.

13. The method of claim 1,
wherein the wind direction offset corresponds to the wind speed at the time of the adjusting,
wherein the wind direction offset is estimated from each statistical representation,
wherein each data set further includes an estimated wind speed,
wherein the statistical representation is determined for a number of wind speed intervals.

14. The method of claim 1, wherein the adjusting of the relative wind direction comprises reducing the wind direction offset by a gain factor smaller than one, wherein the gain factor is the interval of 0.1-0.95.

15. The method of claim 1, wherein the relative wind direction is further adjusted as a function of earlier wind direction offsets.

16. The method of claim 1, further comprising correcting the relative wind direction as measured by the wind direction sensor according to a predefined set of wind correction parameters.

17. The method of claim 1, wherein the control parameter comprises a yaw angle for the wind turbine, and the controlling of the wind turbine comprises yawing the wind turbine according to the yawing parameter.

18. A control system for a wind turbine configured to perform an operation, comprising:
obtaining, at time intervals during operation of the wind turbine, data sets comprising a wind direction relative to the wind turbine as measured by a wind direction sensor, and a pitch angle of at least one of the wind turbine blades;
disregarding a first data set of the data sets upon determining that the first data set indicates that a speed of the wind is below a first wind speed threshold that corresponds to a full load operation of the wind turbine;
determining, as the pitch angle varies over time, a statistical representation of the pitch angle as a function of the relative wind direction based on remaining data sets, wherein the remaining data sets do not include the first data set;
estimating, from the statistical representation, a wind direction offset of the relative wind direction where the pitch angle is a maximum;
adjusting the relative wind direction as a function of the wind direction offset;
determining a control parameter of the wind turbine as a function of the adjusted relative wind direction; and
controlling the wind turbine according to the control parameter.

19. A wind turbine, comprising:
a wind direction sensor;
a yawing system;
wind turbine blades attached to a rotor hub;
and a control system for pitching the blades relative to the rotor hub and for turning the wind turbine rotor relative to the wind, the control system configured to perform an operation, comprising:
obtaining, at time intervals during operation of the wind turbine, data sets comprising a wind direction relative to the wind turbine as measured by the wind direction sensor, and a pitch angle of at least one of the wind turbine blades;
disregarding a first data set of the data sets upon determining that the first data set indicates that a speed of the wind is below a first wind speed threshold that corresponds to a full load operation of the wind turbine;
determining, as the pitch angle varies over time, a statistical representation of the pitch angle as a function of the relative wind direction based on remaining data sets, wherein the remaining data sets do not include the first data set;
estimating from the statistical representation a wind direction offset of the relative wind direction where the pitch angle is a maximum;
adjusting the relative wind direction as a function of the wind direction offset;
determining a control parameter of the wind turbine as a function of the adjusted relative wind direction; and
controlling the wind turbine according to the control parameter.

* * * * *